US007108892B2

(12) United States Patent
Wong

(10) Patent No.: US 7,108,892 B2
(45) Date of Patent: Sep. 19, 2006

(54) METHOD OF DETACKIFYING AN EDGE FACE OF A ROLL OF TAPE

(75) Inventor: Roy Wong, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/633,240

(22) Filed: Aug. 1, 2003

(65) Prior Publication Data

US 2004/0022952 A1 Feb. 5, 2004

Related U.S. Application Data

(62) Division of application No. 09/808,569, filed on Mar. 14, 2001, now Pat. No. 6,623,825.

(51) Int. Cl.
*B05D 5/00* (2006.01)

(52) U.S. Cl. .................... 427/284; 427/285; 427/208.2

(58) Field of Classification Search ................ 427/284, 427/285, 208.2, 421, 428, 429, 430.1, 384, 427/387, 388.4; 428/40.1–40.2
See application file for complete search history.

(56) References Cited

U.S. PATENT DOCUMENTS 3,032,181 A 5/1962 Hutter
3,347,362 A * 10/1967 Rabuse et al. .............. 428/194
4,238,269 A 12/1980 Deering, Jr.
4,565,714 A * 1/1986 Koshar ....................... 427/515
4,751,108 A * 6/1988 Larimore et al. ........... 427/171
4,946,728 A 8/1990 Ikeda et al.
5,536,768 A * 7/1996 Kantner et al. ............. 524/376
5,795,834 A 8/1998 Deeb
5,803,086 A 9/1998 Scholz
5,849,052 A 12/1998 Barber
5,863,620 A 1/1999 Schäfer
5,939,161 A 8/1999 Callahan, Jr. et al.
2002/0168514 A1 11/2002 Wright

FOREIGN PATENT DOCUMENTS

| | | |
|---|---|---|
| EP | 0 197 662 | 10/1986 |
| JP | 50-10353 | 4/1975 |
| JP | 59-43083 | 9/1982 |
| JP | 59-159874 | 9/1984 |
| JP | 01085269 | 3/1989 |
| JP | 7-93806 | 10/1996 |
| WO | WO 98/13199 | 4/1998 |
| WO | 00/78883 | * 12/2000 |

OTHER PUBLICATIONS

Hawley's Condensed Chemical Dictionary, 13th ED., p. 200, 1967.*
Mayzo RA-23 Release Coat product literature Dec. 16, (2 pages).
Mayzo Material Safety Data Sheet RA-23 Release Coat May 21, 1997 (3 pages).

* cited by examiner

*Primary Examiner*—Fred J. Parker
(74) *Attorney, Agent, or Firm*—David B. Patchett

(57) ABSTRACT

A method of detackifying an edge face of a roll of pressure sensitive adhesive tape, the method including contacting an edge face of the roll of tape with a non-free radically curable composition including water and film-forming agent, and drying the composition.

3 Claims, No Drawings

METHOD OF DETACKIFYING AN EDGE FACE OF A ROLL OF TAPE

CROSS REFERENCE TO RELATED APPLICATIONS

This application is a divisional application of U.S. application Ser. No. 09/808,569, filed Mar. 14, 2001, now U.S. Pat. No. 6,623,825 which is hereby incorporated by reference in its entirety.

BACKGROUND OF THE INVENTION

The invention relates to detackifying the edge face of a roll of tape.

A roll of pressure sensitive adhesive tape is often prepared by applying a pressure sensitive adhesive composition to a backing and then winding the backing on a cylindrical core to form the roll of tape. The edge face of the roll of tape often includes exposed pressure sensitive adhesive, which renders the edge face tacky. In addition, when the tape is wound upon a cylindrical core to form a roll, uneven winding may occur which may cause variations in the edge face surface.

Multiple rolls of pressure sensitive adhesive are often packaged in a stack. When rolls of pressure sensitive adhesive tape are stacked on top of one another they tend to block, i.e., stick together. Blocking tends to increase in frequency and degree over time. The edge face of a roll of tape also tends to stick to its packaging, which can make removal of the roll of tape from the packaging difficult. Electrical tape, for example, which is often sold in plastic containers, tends to stick to the plastic walls of the container. The tacky nature of the edge face also tends to attract dust, dirt and other particles from the environment.

A number of methods have been developed to detackify the edge face of a roll of adhesive tape. One common method involves placing a sheet of paper in contact with the edge face, e.g., between two rolls of tape. Another method involves coating the edge face of a roll of tape with very small glass beads. The glass beads, however, tend to fall off of the roll and into the machinery used to manufacture the rolls of tape, which can damage the tape manufacturing machinery. Other methods include applying a detackifying agent to the edge of a strip of tape using a sponge or a cloth. The agent is applied prior to the strip of tape being wound upon a cylindrical core to form a roll.

SUMMARY

In one aspect, the invention features a method of detackifying an edge face of a roll of pressure sensitive adhesive tape, the method including a) contacting an edge face of the roll of tape with a non-free radically curable composition that includes water and film-forming agent, and b) drying the composition. In some embodiments, the film-forming agent includes a polymer selected from the group consisting of ethylene vinyl acetate, polyvinyl acetate, polyvinyl chloride, cellulose and combinations thereof. In other embodiments, the film-forming agent includes polyurethane. In another embodiment, the film-forming agent includes acrylic resin. In another embodiment, the film-forming agent is selected from the group consisting of wax and silicone. In one embodiment, the film-forming agent includes polyethylene wax.

In other embodiments, the composition further includes metal alkyl salt. In one embodiment, the composition further includes fumed silica.

In some embodiments, the roll of tape includes a backing includes a polymer and a pressure sensitive adhesive composition includes rubber. In one embodiment, the backing includes vinyl.

In another embodiment, the roll of tape includes a backing that includes a polymer impregnated fiber scrim and a pressure sensitive adhesive composition that includes rubber disposed on the backing.

In one embodiment, the roll of tape includes a backing that includes cellulose.

In other embodiments, the roll of tape includes a release liner. In some embodiments, the release liner includes polyethylene terephthalate.

In another embodiment, the method further includes contacting a second edge face of the roll of tape with a composition that includes water and film-forming agent, and drying the composition. In one embodiment, the method further includes substantially simultaneously contacting the first edge face with a coating composition and contacting the second edge face with a coating composition.

In another aspect, the invention features a roll of tape includes a first nontacky edge face, a second edge face opposite the first edge face, and an uncrosslinked coating disposed on the first edge face. In one embodiment, when a layer of the coated roll of tape is unwound from the roll, the coating remains adhered to the edge of the layer. In other embodiments, the roll of tape further includes a second uncrosslinked coating disposed on the second edge face, the second edge face being nontacky.

In one embodiment, the coating includes an agent selected from the group consisting of wax, silicone, and combinations thereof. In some embodiments, the average melting point of the wax is at least about 90° C.

In some embodiments, the roll of tape includes a backing includes a polymer and a pressure sensitive adhesive composition includes rubber. In one embodiment the coating includes metal alkyl salt.

In other embodiments, the roll of tape includes a backing includes a polymer and a pressure sensitive adhesive composition includes rubber. In another embodiment, the backing includes vinyl.

In one embodiment, the tape includes a backing includes a polymer impregnated fiber scrim, and a pressure sensitive adhesive composition that includes rubber disposed on the backing. In other embodiments, the roll of tape includes a backing includes cellulose. In another embodiment, the tape includes a pressure sensitive adhesive composition disposed on a release liner. In some embodiments, the release liner includes polyethylene terephthalate.

In another embodiment, the coating on the edge face is discontinuous.

In one embodiment, the coating includes wax selected from the group consisting of ethylene homopolymer wax, microcrystalline wax, polyethylene homopolymer wax, micronized polyolefin wax and combinations thereof.

In other aspects, the invention features a method of detackifying an edge face of a roll of pressure sensitive adhesive tape, the method includes a) contacting an edge face of the roll of tape with a hot melt composition includes wax and b) solidifying the composition. In one embodiment, the average melting point of the wax is at least about 90° C. In other embodiments, the wax is selected from the group consisting of ethylene homopolymer wax, microcrystalline wax, polyethylene homopolymer wax, micronized polyolefin wax and combinations thereof.

The detackified rolls of tape can be packaged without significant sticking to packaging materials such as plastic, cardboard and metal. The detackified rolls of tape can also be stacked upon each other edge face to edge face without blocking such that each detackified roll of tape can be easily removed from the stack. Rolls of tape that include the detackifying composition on their edge faces exhibit minimal to no particulate generation upon unwind or during use. Detackified edge faces of rolls of pressure-sensitive adhesive tape are also less apt to pick up dirt and other contaminates relative to edge faces that have not been detackified.

Other features and advantages of the invention will be apparent from the following description of the preferred embodiments thereof, and from the claims.

DETAILED DESCRIPTION

The method of detackifying the edge face of a roll of tape includes contacting a composition on the edge face of a roll of tape and drying or solidifying the composition to form a nontacky coating on the edge face of the roll of tape. Preferably the coating composition is present on both edge faces of the roll of tape such that the surface of each edge face is nontacky.

The composition is capable of forming a continuous coating upon drying, in the case of aqueous-based coating compositions, and solidifying in the case of hot melt coating compositions. The layer of coating composition present on the edge of the roll of tape is sufficiently thick to detackify the edge of the roll of tape and sufficiently thin such that the coating breaks at the layer interface when the layer of tape is unwound from the roll, i.e., the coating is frangible. The coating is capable of remaining adhered to the edge of the layer of adhesive tape (including the backing and the adhesive composition) with which it is associated prior to, during and after removal of the individual layer from the layered tape construction, e.g., unwind from a roll of tape. The coating does not visibly flake, crumble, form particles, or otherwise fall off of the edge face of the roll of tape or, in the case of a layer that has been unwound from the roll of tape, the layer of unwound tape.

The edge face is preferably sufficiently detackified such that the edge faces of the roll of tape do not substantially stick to the material in which the roll is packaged. The edge face of the roll of tape is also preferably sufficiently detackified such that when multiple detackified rolls are stacked on top of each other edge face to edge face they do not block, i.e., stick together. Preferably the rolls have been detackified such that individual rolls of tape can be separated from one another by pulling after having been placed in a stack of 6 rolls for a period of at least 7 days at 32° C., more preferably after 7 days at 43° C., most preferably after 7 days at 50° C.

A useful coating composition is an aqueous composition (e.g., an emulsion, dispersion or solution) that includes an agent capable of forming a continuous film upon drying, i.e., without undergoing chemical crosslinking and without exposure to radiation. Examples of suitable film-forming agents include polymers such as polyurethane, vinyl resins including e.g., ethylene vinyl acetate, polyvinyl chloride and polyvinyl acetate, cellulosic polymers including, e.g., nitrocellulose, acrylic resins, and silicone and blends thereof. Other useful film-forming agents include waxes. Wax is selected to have a melting point above the use temperature. Preferred waxes have a melting point greater than about 65° C. (150° F.), more preferably greater than about 93° C. (200° F.), most preferably greater than about 116° C. (240° F.). Polyethylene wax is one example of a suitable wax.

The composition can also include a metal alkyl salt including, e.g., calcium stearate. Useful metal alkyl salts are commercially available under the trade designation Dymsol CSD from Geo Specialty Chemicals, Inc. (Cedartown, Ga.).

Fillers can be added to the coating composition to facilitate separation of the layers of tape upon unwind. One example of a useful filler is fumed silica, which can also function as a matting agent to provide a matte finish to the dried coating.

The coating composition can also include other additives including, e.g., surfactants, pH modifiers, pigment, dispersants, defoaming agents, and combinations thereof.

Commercially available compositions that are suitable for detackifying the edge face include, e.g., polyvinyl acetate emulsions available under the trade designation Airflex 508 from Air Products Polymers, L. P. (Allentown, Pa.), polyvinyl acetate emulsions available under the trade designation AIRFLEX 728 from Air Products Polymers, acrylic dispersions available under the trade designation JONCRYL 660 from SC Johnson Polymer, S. C. Johnson & Sons, Inc., (Racine, Wis.), wax compositions available under the trade designations JONWAX 28 and JONWAX 39 from SC Johnson Polymer, S. C. Johnson & Sons, Inc., nonionic polyethylene wax available under the trade designation VANCRYL Wax 35 from Air Products Polymers, aqueous cellulose compositions that include a source of cellulose available, for example, under the trade designation METHOCEL A-400 from Dow Chemical Company (Midland, Mich.), urethane dispersions available under the trade designation FLEXTHANE 620 Air Products Polymers, and silicone dispersions available under the trade designations Dow 24, Dow 346 and Dow 929 from Dow Corning Company (Midland, Mich.).

The coating composition can be applied to the edge face using a variety of methods including, e.g., contacting the edge face with a cloth, sponge or brush, roll coating, spray coating and dip coating.

The coating composition and the coating weight applied to the edge face of the roll of tape to be detackified are selected based upon a variety of factors related to the roll of tape including, e.g., the adhesive composition, the coating weight of the adhesive composition and the backing of the roll of tape. The coating weight applied to the edge face of the roll of tape is preferably sufficiently great to detackify the edge face and to provide a uniform coating on the edge face, yet sufficiently small to provide a frangible coating. Surface variations present on the edge face of a roll of tape will affect the coating weight necessary to detackify the edge face. Surface variations can result from a variety of factors including, e.g., uneven tape winding and cutting processes. The coating weight can be varied depending upon the surface variations present on the edge face. Suitable dry coating weights range from about 10 $g/m^2$ to about 25 $g/m^2$.

The coating on the edge face of the roll of tape is preferably continuous but can be applied as a continuous or discontinuous coating including, e.g., a pattern (e.g., dots or stripes).

The tape includes a pressure sensitive adhesive tape disposed on a backing and is wound upon itself in the form of a roll of tape. Useful tape backings include backings, release liners, release coated materials and combinations thereof. Examples of useful tape constructions include polymeric film, paper, metal foil, foam, reinforced, double-faced and transfer tape. Other useful tape constructions include composite backings, composite liners, multi-layer backings and combinations thereof.

Examples of useful tape backings include cellophane, acetate, fiber, polyester, vinyl, polyethylene, polypropylene including, e.g., monoaxially oriented polypropylene and biaxially oriented polypropylene, polytetrafluoroethylene, polyvinylfluoroethylene, polyurethane, polyimide, paper (e.g., kraft paper), woven webs (e.g., cotton, polyester, nylon and glass), nonwoven webs, foil (e.g., aluminum, lead, copper, stainless steel and brass foil tapes) and combinations thereof. The roll of tape can include a release liner in addition to the backing.

Examples of useful release liners include papers, polymeric film, and woven and nonwoven fabric. The release liner can include a release coating composition including, e.g., silicone, fluorocarbons, carbamate and polyolefins including, e.g., polyethylene and polypropylene.

Backings and, when present, release liners can also include reinforcing agents including, e.g., fibers, filaments (e.g., glass fiber filaments), and saturants, e.g., synthetic rubber latex saturated paper backings. One useful backing includes a polymer impregnated fiber scrim.

Common tape types that can be detackified include masking tape, electrical tape, duct tape, filament tape, medical tape, and rolls of tape that are commercially available under the trade designation SCOTCH MAGIC MENDING Tape from Minnesota Mining and Manufacturing (St. Paul, Minn.).

The method is particularly useful for detackifying the edge face of a roll of tape that includes a pressure sensitive adhesive composition. The roll of tape may include pressure sensitive adhesive compositions that include, e.g., natural rubber, polyisobutylene, styrene butadiene rubber, polyacrylate, styrene-isoprene-styrene copolymers, styrene-butadiene-styrene copolymers, polyisobutylene, polyisoprene, polyurethane, polyvinyl ethyl ether and blends thereof.

A useful detackifying composition for a tape having a polyvinylchloride backing and a natural rubber adhesive composition that includes metal alkyl salt and nonionic polyethylene wax. Preferably the solids content of the wet composition includes from about 30% by weight to about 60% by weight metal alkyl salt and from 70%/o by weight to about 40% by weight nonionic polyethylene wax.

A useful detackifying composition for a roll of transfer tape having a silicone release liner and an acrylic adhesive composition includes a film-forming agent and a metal alkyl salt. Preferably the metal alkyl salt is present in the coating composition in an amount of from about 3% by weight to about 10% by weight.

An alternative coating composition for detackifying the edge face of a roll of pressure sensitive adhesive tape is a hot melt composition that includes a high melting point wax, i.e., the average a melting point is at least about 90° C. Examples of useful high melting temperature waxes include synthetic polyolefin wax including, e.g., ethylene homopolymer wax, microcrystalline wax, polyethylene homopolymer wax and micronized polyolefin wax, and combinations thereof. Suitable commercially available high melting point waxes include C-4040 ethylene hompolymer wax having a melting point of 103° C. (217° F.) from Bareco Products (Rock Hill, S.C.), Be-Square 95 microcrystalline wax having a melting point of 90° C. (194° F.) from Bareco Products, 9-A polyethylene hompolymer wax having a Mettler drop point of 117° C. (243° F.) wax from Allied Corporation (Morristown, N.J.) and Acumist B-6 micronized polyolefin wax having a Mettler drop point of 126° C. (259° F.) from Allied Corporation.

Preferably high melt temperature waxes are applied to the edge face at a coating weight of from about 15 g/m$^2$ to about 50 g/m$^2$, more preferably from about 24 g/m$^2$ to about 43 g/m$^2$.

The invention will now be described further by way of the following examples. All parts, ratios, percents and amounts stated in the Examples are by weight unless otherwise specified.

EXAMPLES

Test Procedures

Test procedures used in the examples include the following.

Detack Test Method

The presence of tack on the edge face of a roll of adhesive tape is detected by touching with finger tips. If the edge face is nontacky, the edge face is determined to be detackified.

Heat Aging Test Method

A package is prepared by placing a roll of tape in a polyethylene bag. The packages of tape are then stacked on top of each other and a 10 lb. weight is placed on top of the stack. The package is placed in an oven at 55° C. (130° F.) for one week. The package is then removed from the oven and an attempt is made to separate the roll from the polyethylene bag by hand. If the roll of tape can be easily separated from the bag by hand, the sample is recorded as a pass. If the roll of tape requires a force greater than about 1 Kg to separate from the bag, the sample is recorded as a "fail."

Example 1

A composition was prepared by diluting a Joncryl 660 acrylic dispersion (SC Johnson Polymer, S. C. Johnson & Sons, Inc.) to 24% by weight solids in water. Dymsol CSD calcium stearate (Geo Specialty Chemicals, Inc., Cedartown, Ga.) was added to the diluted dispersion to provide a 27% by weight solids composition.

The 27% solids composition was coated on the edge face of a number of 14.6 cm diameter rolls of adhesive transfer tape at a coating weight of 7.5 g/m$^2$. The tape construction included a tackifed acrylic adhesive composition disposed on a silicone coated paper release liner.

The rolls of tape were dried with a hand held hot air heat gun. After cooling, the edge face of each roll of tape was touched with fingertips and found to be nontacky.

The rolls of tape were then conditioned at 55° C. for one week and tested according to the Heat Aging Test Method. The rolls of tape were easily removed from the polyethylene bag by hand.

Example 2

C-4040 ethylene homopolymer wax having a melting point of 103° C. (217° F.) (Allied Corporation, Morristown, N.J.), was heated to 127° C. (260° F.) and coated at a coating weight of 35 g/m$^2$ on the edge face of a roll of SCOTCH high performance specialty filament tape #890 C (Minnesota Mining and Manufacturing, St. Paul, Minn.) using THE ORIGINAL HOT WAXER wax applicator (Hertle and Co., Inc., Palo Alto, Calif.), which included a heated silicone rubber roller onto which the melted wax was metered by a patterned gravure roller.

The coated edge face was nontacky when touched with fingertips.

Example 3

9-A polyethylene homopolymer wax having a Mettler drop point of 117° C. (243° F.) wax (Allied Corporation, Morristown, N.J.) was heated to 149° C. (300° F.) and coated at a coating weight of 40 g/$m^2$ on the edge face of a roll of SCOTCH high performance specialty filament tape #890 C using THE ORIGINAL HOT WAXER wax applicator (Hertle and Co., Inc.), which included a heated silicone rubber roller onto which the melted wax was metered by a patterned gravure roller.

The coated edge face was nontacky when touched with fingertips.

Example 4

Be-Square 95 microcrystalline wax having a melting point of 90° C. (194° F.) (Bareco Products, Rock Hill, S.C.) was heated to 127° C. (260° F.) and coated at a coating weight of 15 g/$m^2$ on the edge face of a roll of SCOTCH SUPER 33+ vinyl electrical tape (Minnesota Mining and Manufacturing, St. Paul, Minn.) using THE ORIGINAL HOT WAXER wax applicator (Hertle and Co., Inc.), which included a heated silicone rubber roller onto which the melted wax was metered by a patterned gravure roller. The wax coating solidified by cooling in air.

The coated edge face was nontacky when touched with fingertips.

Example 5

Acumist B-6 micronized polyolefin wax having a Mettler drop point of 126° C. (259° F.) (Allied Corporation, Morristown, N.J.) was heated to 127° C. (260° F.) and coated at a coating weight of 15 g/$m^2$ on the edge face of a roll of SCOTCH SUPER 33+ vinyl electrical tape using THE ORIGINAL HOT WAXER wax applicator (Hertle and Co., Inc.), which included a heated silicone rubber roller onto which the melted wax was metered by a patterned gravure roller. The wax coating solidified by cooling in air.

The coated edge face was nontacky when touched with fingertips.

Other embodiments are within the following claims.

What is claimed is:

1. A method of detackifying an edge face of a roll of pressure sensitive adhesive tape, said method comprising:

a) contacting an edge face of the roll of tape with a hot melt composition comprising wax; and b) solidifying said composition.

2. The method of claim 1, wherein the average melting point of said wax is at least about 90° C.

3. The method of claim 2, wherein said wax is selected from the group consisting of ethylene homopolymer wax, microcrystalline wax, polyethylene homopolymer wax, micronized polyolefin wax and combinations thereof.

* * * * *